(12) United States Patent
Dey et al.

(10) Patent No.: US 8,290,357 B2
(45) Date of Patent: Oct. 16, 2012

(54) AUTO-EXPOSURE TECHNIQUE IN A CAMERA

(75) Inventors: Soumenkumar Dey, Pune (IN);
Vinayak Pore, II, Pune (IN);
Jaiprakash Rao, Pune (IN); Ankur Gupta, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 307 days.

(21) Appl. No.: 11/686,956

(22) Filed: Mar. 15, 2007

(65) Prior Publication Data

US 2008/0226279 A1 Sep. 18, 2008

(51) Int. Cl.
*G03B 7/08* (2006.01)
*H04N 5/235* (2006.01)
(52) U.S. Cl. .................. 396/234; 348/221.1
(58) Field of Classification Search .......... 396/213, 396/233, 234, 452; 348/221.1, 223.1
See application file for complete search history.

(56) References Cited

U.S. PATENT DOCUMENTS

| | | | |
|---|---|---|---|
| 6,456,737 B1 | 9/2002 | Woodfill et al. | |
| 7,020,783 B2 | 3/2006 | Vange et al. | |
| 7,236,470 B1 | 6/2007 | Bims | |
| 7,574,016 B2 | 8/2009 | Steinberg et al. | |
| 2003/0123751 A1 | 7/2003 | Krishnamurthy et al. | |
| 2003/0128756 A1 | 7/2003 | Oktem | |
| 2005/0024487 A1 | 2/2005 | Chen | |
| 2005/0275747 A1* | 12/2005 | Nayar et al. | 348/362 |
| 2006/0215924 A1 | 9/2006 | Steinberg et al. | |
| 2006/0274643 A1 | 12/2006 | Choyi et al. | |
| 2006/0291845 A1 | 12/2006 | Sugimoto | |
| 2007/0104472 A1 | 5/2007 | Quan et al. | |
| 2007/0206941 A1* | 9/2007 | Maruyama et al. | 396/153 |
| 2008/0043686 A1 | 2/2008 | Sperti et al. | |
| 2008/0152245 A1 | 6/2008 | El-Maleh et al. | |
| 2008/0225944 A1 | 9/2008 | Pore et al. | |

OTHER PUBLICATIONS

Sun et al., "A Rate Control Algorithm for Wireless Video Transmission Using Perceptual Tuning", Proceedings of the International Conference on Information Technology: Coding and Computing (ITCC'05), 0/7695-2315-3/05 IEEE, pp. 1-6, 2005.
Tong et al., "Region of Interest Bases H.263 Compatible Codec and Itsrate Control for Low Bit Rate Video Conferencing", Proceedings of 2005 International Symposium on Intelligent Signal Processing and Communication Systems, pp. 249-252, Dec. 13-16, 2005.
Baccichet et al., "Network-Aware H.264/AVC Region of Interest Coding for a Multi-Camera Wireless Surveillance Network", pp. 1-6, Downloaded Mar. 2007.
Sun et al., "Region-Based Rate Control and Bit Allocation for Wireless Video Transmission", IEEE Transactions on Multimedia, vol. 8, No. 1, pp. 1-10, Feb. 2006.

(Continued)

*Primary Examiner* — Rodney E Fuller

(57) ABSTRACT

An image processor, which determines appropriate exposure parameters for a shutter assembly in a camera. The image processor may computationally determine a region of interest in a scene sought to be captured, and set the parameters to ensure that the exposure parameters are set to capture an image of the scene with the region of interest having a desired brightness level. In an embodiment, pixel values of multiple frames (each frame with a corresponding set of configuration parameters of the shutter assembly) may be examined to determine the frame having pixel values with the region having the desired brightness level. The shutter assembly may be configured with the parameters corresponding to such a frame to provide an auto-exposure feature.

20 Claims, 13 Drawing Sheets

OTHER PUBLICATIONS

Chen et al., "Region-of-Interest Video Coding Based on Face Detection", Springer-Verlag Berlin Heidelberg, pp. 1201-1211, 2002.

Baccichet, "H.264/AVC Compliant Solutions for SLEP-Based Error Robustness and for Video Surveillance", I.E.I.I.T.—National Research Center Turin-Italy, pp. 1-29, Stanford, Dec. 9, 2005.

* cited by examiner

AUTO-EXPOSURE TECHNIQUE IN A CAMERA

RELATED APPLICATIONS

The present application is related to the following copending U.S. applications, which are incorporated in their entirety herewith:

1. Entitled, "AUTO-FOCUS TECHNIQUE IN AN IMAGE CAPTURE DEVICE," filed: on even date herewith, Ser. No. 11/686,958, inventors: Garg et al.; and 2. Entitled, "ALLOCATION OF AVAILABLE BITS TO REPRESENT DIFFERENT PORTIONS OF VIDEO FRAMES CAPTURED IN A SEQUENCE," filed: on even date herewith, Ser. No. 11/686,955, inventors: Pore et al.

BACKGROUND

1. Field of Disclosure

The present disclosure relates generally to cameras, and more specifically to an auto-exposure technique in a camera.

2. Related Art

A camera generally refers to a device, which is designed to capture an image of a scene. The image can be captured in digital form or analog form. To capture images in digital form, sensors may be arranged in the form of an array, with each sensor in the array forming a digital value representing a point (small portion) of the scene. On the other hand, in analog form, a light-sensitive medium is designed to respond to incident rays to capture the image. In general, the sensors and other media, which capture the images, are referred to as capturing medium.

The brightness of a captured image may depend, at least in part, on the amount/quantum of light from a scene that is incident on the capturing medium. Incidence of too little light may result in a poor quality dark image, while incidence of too much light may result in an overly 'white' image, again of poor quality. Accordingly, it is generally desirable to ensure that appropriate quantum of light is incident on the capturing medium.

The quantum of light incident is often controlled by causing a shutter assembly to be open for a duration ("open duration") proportionate to the quantum of light deemed to be appropriate for the desired level of brightness. However, techniques such as varying the aperture of the shutter assembly, etc.( in general, configuring an exposure setting using corresponding exposure parameters) can also be employed in addition to or in combination with controlling open duration to obtain a desired level of brightness.

As the techniques of operating shutter assemblies generally 'expose' the capturing medium to a desired quantum of light, the techniques are referred to as exposure techniques. The open duration is referred to as exposure time.

Several cameras provide manual exposure techniques by which a user can configure the exposure parameters (open duration and/or aperture width in the above examples) to obtain a desired brightness level.

On the other hand, there has been a general recognized need for auto-exposure cameras. Auto-exposure generally refers to determining the appropriate exposure parameters (e.g., exposure time and aperture size in the examples above) to configure the shutter assembly, and performing the determined configuration by using appropriate computations and configurations within a camera.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

An aspect of the present invention provides an auto-exposure feature such that a shutter assembly in a camera is automatically configured with optimal parameters. In an embodiment, a processor in the camera configures the shutter assembly with different sets of parameters and receives a corresponding set of pixel values representing the image of a scene for each set of parameters. The processor may then examine the sets of pixel values to determine a region of interest in the scene, and determine the set in which the brightness level of pixels in the region of interest is closest to a desired level. The processor then configures the shutter assembly with the parameters corresponding to the parameters of the determined set.

By ensuring that the exposure parameters are optimized for a desired region of interest in a scene, images may be captured with optimal brightness for such portions irrespective of brightness levels in other portions of the images of the scene.

In an embodiment, the region of interest corresponds to a face, and the brightness level for each image is determined as the average of the luminance component of the pixel values in the region of interest.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

Example Camera

Figure 1:
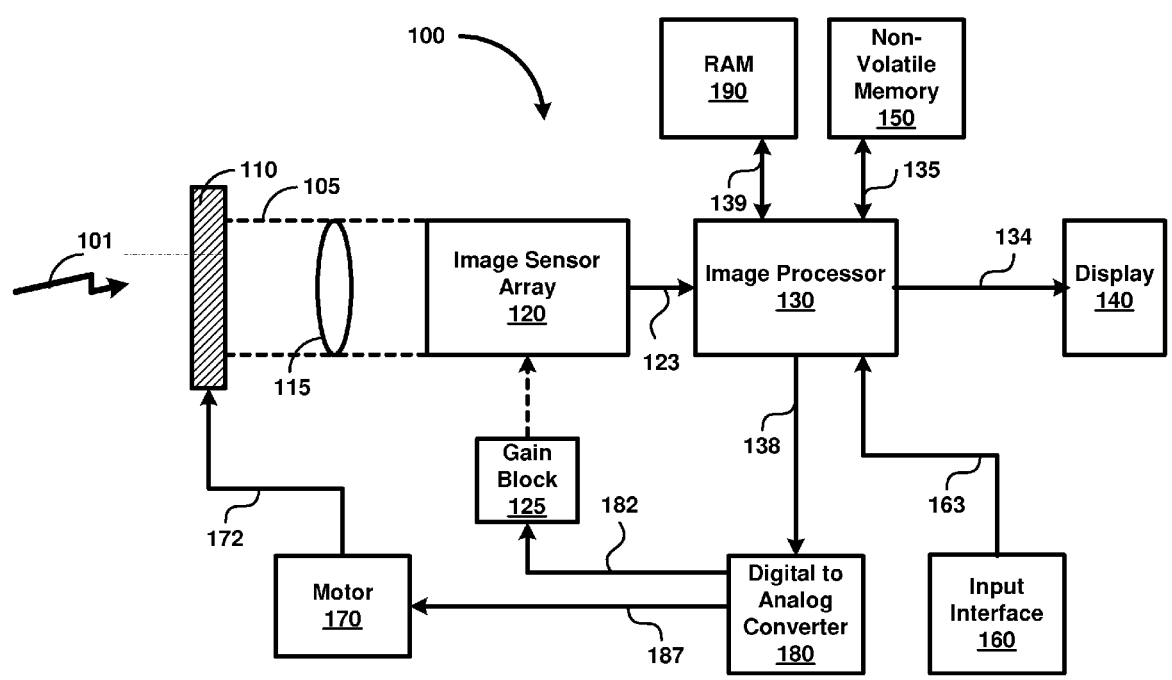
FIG. 1 is a block diagram of a camera illustrating an example embodiment in which several aspects of the present invention may be implemented.

FIG. 1 is a block diagram of a camera used to illustrate an example embodiment in which several aspects of the present invention may be implemented. Camera 100 is shown containing lens enclosure 105, shutter assembly 110, lens assembly 115, image sensor array 120, gain block 125, image processor 130, display 140, non-volatile memory 150, input (I/P) interface 160, motor 170, digital to analog (D/A) converter 180, and RAM 190. Only the components as pertinent to an understanding of the operation of the example embodiment are included and described, for conciseness and ease of understanding. Each component of FIG. 1 is described in detail below.

Lens enclosure 105 (denoted by dotted lines) is shown housing lens assembly 115 and image sensor array 120, and is generally designed to shield extraneous (i.e., other than the light being received via the lens assembly) light from being incident on image sensor array 120 (in general, capturing medium). Lens assembly 115 may contain one or more lenses, which can be configured to focus light rays (denoted by arrow 101) from a scene to impinge on image sensor array 120.

Gain block 125 receives one or more analog signals (representing a gain factor) from D/A converter 180 on path 182, and provides a corresponding gain (amplification or attenuation) to the output signals (e.g., in the form of charge or voltage) of sensors in image sensor array 120. Thus, each pixel value from image sensor array 120 may be caused to be amplified by the received gain factor. Although gain block 125 is shown as a separate block, it may be implemented inside image sensor array 120. The gain may be specified as a single value for all the pixel values or as different values for different channels (e.g., rows).

Image sensor array 120 may contain an array of sensors, with each sensor generating an output value representing the corresponding point (small portion or pixel) of the image, and proportionate to the amount of light that is allowed to fall on the sensor. The output of each sensor may be amplified/attenuated by gain block 125, and converted to a corresponding digital value (for example, in RGB format). The digital values, produced by the sensors are forwarded on path 123 to image processor 130 for further processing.

Shutter assembly 110 operates to control the amount of light (101) entering lens enclosure 110, and hence the amount of light falling/incident on image sensor array 120. Shutter assembly 110 may be operated to control either a duration (exposure time) for which light is allowed to fall on image sensor array 120, and/or a size of an aperture of the shutter assembly through which light enters the camera. A longer exposure time would result in more amount of light falling on image sensor array 120 (and a brighter captured image), and vice versa. Similarly, a larger aperture size (amount of opening) would allow more light to fall on image sensor array 120, and vice versa.

Though the description is provided with respect to shutter assemblies based on mechanical components (which are controller for aperture and open duration), it should be appreciated that alternative techniques (e.g., polarization filters, which can control the amount of light that would be passed) can be used without departing from the scope and spirit of several aspects of the present invention. Shutter assembly 110 may be implemented in a known way using a combination of several of such technologies, depending on the available technologies (present or future), desired cost/performance criteria, etc.

D/A converter 180 receives digital values from image processor 130 (on path 138) representing exposure time, aperture size, and gain value for gain block 125 and converts the digital values to respective analog signals. Analog signals corresponding to exposure time and aperture size are provided to motor 170 via path 187, while analog signals corresponding to gain value are provided to gain block 125 via path 182. It should be understood that the digital values corresponding to exposure time, aperture size and gain value represent an example configuration setting used to configure camera 100 for a desired brightness. However, depending on the implementation of shutter assembly 110 and design of image sensor array 120 (including gain block 125), additional/different/subset parameters may be used to control the shutter assembly as well.

Motor 170 is shown coupled to shutter assembly 110, and operates to open/close the shutter (for a desired duration) or set a desired aperture size for shutter assembly 110, in response to receiving corresponding analog signals from D/A converter 180. Motor 170 may be coupled to shutter assembly 110 in a manner facilitating movement of one or more parts or plates to open/close completely or to an extent corresponding to a desired aperture size.

Display 140 displays an image frame in response to the corresponding display signals received from image processor 130 on path 134. Display 140 may also receive various control signals (not shown) from image processor 130 indicating, for example, which image frame is to be displayed, the pixel resolution to be used etc. Display 140 may also contain memory internally for temporary storage of pixel values for image refresh purposes, and is implemented in an embodiment to include an LCD display.

Input interface 160 provides a user with the facility to provide inputs, for example, to select features such as whether auto-exposure is to be enabled/disabled. The user may be provided the facility of any additional inputs, as described in sections below.

RAM 190 stores program (instructions) and/or data used by image processor 130. Specifically, pixel values that are to be processed and/or to be user later, may be stored in RAM 190 via path 139 by image processor 130.

Non-volatile memory 150 stores image frames received from image processor 130 via path 135. The image frames may be retrieved from non-volatile memory 150 by image processor 130 and provided to display 140 for display. In an embodiment, non-volatile memory 150 is implemented as a flash memory. Alternatively, non-volatile memory 150 may be implemented as a removable plug-in card, thus allowing a user to move the captured images to another system for viewing or processing or to use other instances of plug-in cards.

Non-volatile memory 150 may contain an additional memory unit (e.g. ROM, EEPROM, etc.), which store various instructions, which when executed by image processor 130 provide various features of the invention described herein. In general, such memory units (including RAMs, non-volatile memory, removable or not) from which instructions can be retrieved and executed by processors are referred to as a computer readable medium.

Image processor 130 forwards pixel values received on path 123 to path 134 to enable a user to view the scene presently pointed by the camera. Further, when the user 'clicks' a button (indicating intent to record the captured image on non-volatile memory 150), image processor 130 causes the pixel values representing the present (at the time of clicking) image to be stored in memory 150.

In addition, image processor 130 may configure shutter assembly 110 and gain block 125 to obtain a desired exposure on a scene according to several aspects of the present invention, and the description is accordingly continued with the internal details of image processor 130 in one embodiment.

Image Processor

Figure 2:
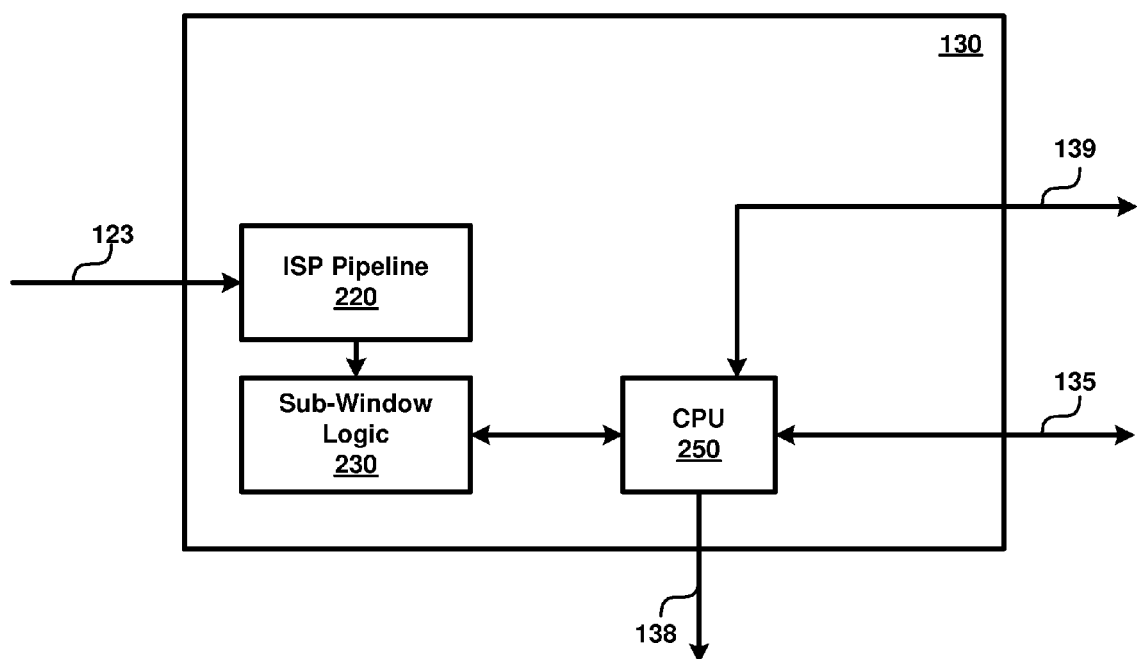
FIG. 2 is a block diagram of the internal details of an image processor operating to configure a shutter assembly to provide auto-exposure feature in one embodiment.

FIG. 2 is a block diagram of image processor 130 in one embodiment. Merely for illustration, several features are described below with respect to the components of FIG. 2. However the features can be implemented in various other processors as well, without departing from the scope and spirit of several aspects of the present invention. Image processor 130 is shown containing image signal processor (ISP) pipeline 220, sub-window logic 230, and central processing unit (CPU) 250. Image processor 130 may contain other components/blocks also, but are not shown as not being relevant to an understanding of the described embodiment. Each component is described in detail below.

ISP pipeline 220 receives a stream of pixel values representing an entire image (row wise) on path 123. The pixel values may be received directly from image sensor array 120 (of FIG. 1). ISP pipeline 220 may be implemented as a shift register, and shifts in pixels received on path 123, and transfers the pixels to buffer registers or other internal buffer, from which CPU 250 may retrieve pixel values via sub-window logic 230. ISP pipeline 220 may perform various operations on the stored pixels such as optical black restoration (subtracting a black color reference level from each of the pixels), sensor linearization (which removes non-linear effects of image sensor array 120), white balance, color correction (transformation of pixel values from one color space to another specific color space), gamma correction, demosaicing (R/G/B pixel signals obtained from Bayer color filter array converted to simultaneous R/G/B component values) etc.

Sub-window logic 230 receives control inputs from CPU 250 specifying dimensions and locations of one or more sub-windows (e.g., in the form of rectangular areas) in the captured image that are to be subsampled. For each of a group (for example, nine adjacent pixels) of pixel values in the sub-window, sub-window logic 230 computes the average of the pixel values in the group, and generates a corresponding single pixel value having the computed average value. The 'averaged' pixels thus generated form a subsampled version of portion of the image in the sub-window, and the subsampled version is provided by sub-window logic 230 to CPU 250. In an embodiment, sub-window logic 230 provides a 64×64 pixel wide subsampled version of images captured by image sensor array 120, and provides them to CPU 250.

CPU 250 may then operate on the subsampled image to determine desired exposure parameters, as described in detail below. Operation on such sub-sampled images reduces the computational requirements in CPU 250. However, alternative embodiments can be implemented to operate without subsampling as well. Irrespective, CPU 250 may determine a desired set of exposure parameters by examining/processing the image data (either in subsampled form or otherwise), as described with examples below.

Auto-Exposure

Figure 3:
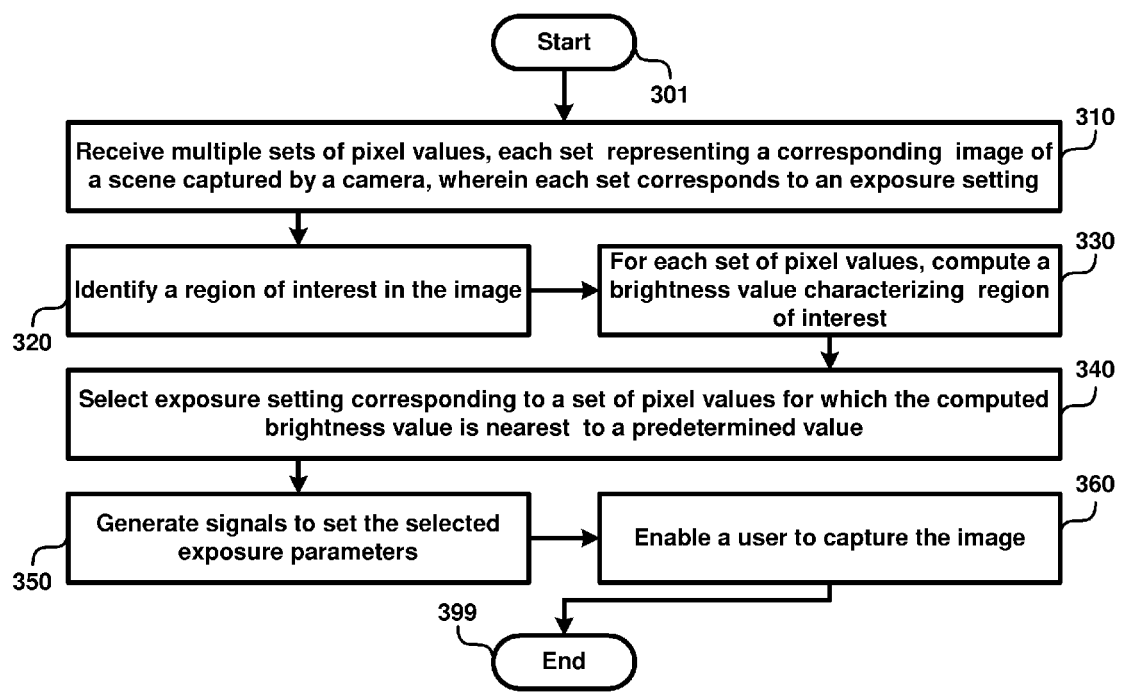
FIG. 3 is a flowchart illustrating the manner in which auto-exposure on a scene is achieved in one embodiment.

FIG. 3 is a flowchart illustrating the manner in which auto-exposure is achieved in one embodiment. The flowchart is described with respect to FIGS. 1 and 2, and in relation to the components of image processor 130, merely for illustration. However, various features can be implemented in other environments and other components. Furthermore, the steps are described in a specific sequence merely for illustration. Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, CPU 250 receives multiple sets of pixel values. Each set of pixel values represents a corresponding image of a scene captured by camera 100 using a corresponding exposure setting, i.e., obtained using a corresponding set of exposure parameters (exposure time and aperture size of shutter assembly 110 in the illustrative example). In a digital camera, in addition to exposure time and aperture size for shutter assembly 110, gain value of gain block 125 may also constitute an exposure parameter. Each set of exposure parameters is designed to obtain a different level of brightness. It is also assumed that each image captures the same scene, but with correspondingly different levels of exposure.

In an embodiment, each set of pixel values received represents a subsampled version (obtained by subsampling the image captured by image sensor array 120) of the image, wherein each pixel value in the subsampled version is generated by averaging the pixel values of a group of adjacent pixels captured by lens assembly 115. With respect to FIG. 2, sub-window logic 230 performs the subsampling, and forwards the subsampled image to CPU 250. Control then passes to step 320.

In step 320, CPU 250 identifies a region of interest within each image (corresponding to each set of pixel values received in step 310). CPU 250 may be implemented with appropriate logic (rules, processing logic, etc.) to identify the region of interest. A region of interest may be an area representing an object, color etc, in the image. For example, pixel locations representing a facial region constitute the region of interest in one embodiment. If different objects/features (e.g., face, grass, sky, etc.) are of possible interest, appropriate inputs may be provided to CPU 250 to identify the specific locations of interest within the scene. However, other approaches as suited for the specific environment, may be used to determine the region of interest. Control then passes to step 330.

In step 330, for each set of pixel values, CPU 250 computes a brightness value characterizing (being a measure of the brightness of) the region of interest. In an embodiment, the brightness value is the average of the luminance (e.g., Y component in a YCbCr color space representation) components of the pixel values of pixels in the region of interest. In an embodiment, the brightness value is computed based on the source image (without sub-sampling), thereby lending to a potentially more accurate measure of brightness at the expense of increased computational complexity. Control then passes to step 340.

In step 340, CPU 250 selects the set of exposure parameters (as optimal exposure parameters) corresponding to the set of pixel values for which the brightness value (computed in step 330) is closest to a predetermined value. The predetermined value may be obtained experimentally by capturing a series of images of a scene at different exposure levels (with different sets of exposure parameters for shutter assembly 110 and/or gain block 125), and computing the average of the luminance component of the pixel values in the region of interest in the image that provides a desired brightness. Other techniques (either empirical or theoretical) may also be used for selecting the predetermined value. In an embodiment, the predetermined value is 80 in case of human skin. Control then passes to step 350.

In step 350, CPU 250 generates signals to set exposure parameters in camera 100. In an embodiment, the signals correspond to exposure time and aperture size of shutter assembly 110, and gain value for gain block 125. CPU 250 provides digital values for each (or a combination) of exposure time, aperture size and gain value to D/A converter 180, which in turn provides corresponding analog signals to motor 170 and gain block 125 as described earlier. Control then passes to step 360.

In step 360, CPU 250 enables a user to capture the image. CPU 250 may indicate to a user that a desired exposure setting has been determined, for example, by displaying a message on display 140. The user may then 'click' on the scene. In response to a user's 'click', camera 100 exposes image sensor array 120 to the scene according to the exposure parameters determined in step 350, and CPU 250 stores a set of pixel values of the image captured using the determined exposure parameters. Control then passes to step 399, in which the flowchart ends.

By ensuring that the exposure parameters are optimized for a desired region of interest in a scene, images may be captured with optimal brightness for such portions irrespective of brightness levels in other portions of the image.

In the description above, although CPU 250 is described as receiving multiple sets of pixel values, each corresponding to a different set of exposure parameters, it must be understood that CPU 250 may provide the parameters corresponding to each of the sets of pixel values.

In particular, CPU 250 may adaptively determine the set of exposure parameters until a desired level of brightness is obtained. In such an adaptive technique, CPU 250 may receive a single set of pixel values in each iteration, determine if the level of brightness is as desired, and provide a new set of exposure parameters for the next iteration based on the level of brightness identified for the previous iterations. CPU 250 may then repeat such combination of steps until a desired level of brightness is obtained.

Furthermore, even though CPU 250 is described as selecting the exposure parameters corresponding to the image with the brightness value closest to a desired brightness level, it should be appreciated that more complex computations can be performed to determine the optimal exposure parameters. The computations may be based on the brightness levels determined with the (portions of) images received and the parameter sets used in obtaining each of the received images. The optimal exposure parameters may be determined, for example, in combination of the adaptive determination noted in the previous paragraph.

As noted above, CPU 250 selects a set of exposure parameters such that a brightness value characterizing a desired region of interest is nearest to a predetermined value. In an embodiment, the region of interest corresponds to 'face', and face is determined by first determining whether a pixel of an image corresponds to skin. The manner in which pixels corresponding to skin can be identified is described below in further detail.

Identifying Pixels Representing Skin

Figure 4:
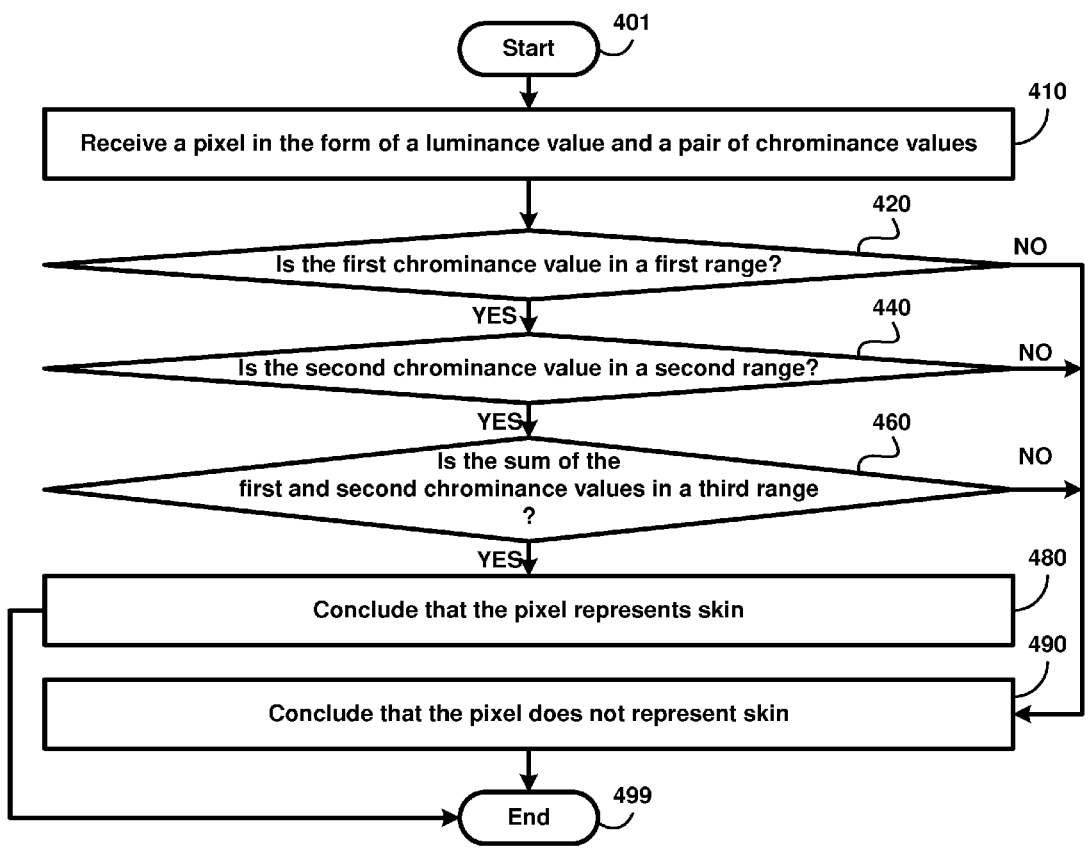
FIG. 4 is a flowchart illustrating the manner in which pixels representing skin are identified in one embodiment.

FIG. 4 is a flowchart illustrating the manner in which image processor 130 identifies pixels representing skin in one embodiment. Again, the flowchart is described with respect to FIG. 1, and in relation to image processor 130, merely for illustration. However, various features can be implemented in other environments and other components. Furthermore, the steps are described in a specific sequence merely for illustration. Various alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 401, in which control passes immediately to step 410.

In step 410, image processor 130 receives a pixel in the form of a luminance value and a pair of chrominance values. In an embodiment, the luminance and chrominance values correspond to the respective values in a YCbCr color space representation (Y corresponding to the luminance value, Cb and Cr corresponding to the pair of chrominance values). Image processor 130 may receive the pixel value in YCbCr form from an external system (such as image sensor array 120), or may internally perform color space conversion of pixel value received in an alternative form (for example, RGB). Control then passes to step 420.

In step 420, image processor 130 determines whether the first chrominance value (Cb) lies in a first range of values. Control passes to step 440 if the value is in the range, else control passes to step 490. In an embodiment the first range corresponds to a range of values between 67 and 123 (both inclusive).

In step 440, image processor 130 determines whether the second chrominance value (Cr) lies in a second range of values. Control passes to step 460 if the value is in the range, else control passes to step 490. In an embodiment the second range corresponds to a range of values between 136 and 175 (both inclusive).

In step 460, image processor 130 determines whether the sum of the first chrominance value (Cb) and the second chrominance value (Cr) lies in a third range of value. Control passes to step 480 if the value is in the range, else control passes to step 490. In an embodiment the third range corresponds to a range of values between 220 and 275 (both inclusive).

In step 480, image processor 130 concludes that the pixel represents skin. Control then passes to step 499, in which the flowchart ends. In step 490, image processor 130 concludes that the pixel does not represent skin. Control then passes to step 499, in which the flowchart ends.

It should be appreciated that the above approach and ranges have been determined based on various experiments and observations. The approach facilitates identifying pixels representing skin with minimal computations (one addition and three comparisons), which facilitates the determination to be performed with minimal processing resources.

It should also be appreciated that approach can be extended to potentially several other objects with appropriate changes to the ranges, as will be apparent to one skilled in the relevant arts by reading the disclosure provided herein.

In one embodiment, to facilitate further processing as regards to auto-exposure, for each pixel in a set of pixels corresponding to an image, image processor 130 determines whether the pixel represents skin or not in a manner illustrated above, and generates a corresponding 'skin map' of the image. The skin map can be in the form of an array equaling the dimensions of image sensor array 120, with each bit of the map indicating whether the output of the corresponding sensor element represents skin or not (as a binary value).

Alternatively, the skin map can have the same dimensions as the subsampled image described elsewhere in the present application, for reduced computational complexity. The skin map may be generated for each frame (or at some intervals), since the level of brightness can have a bearing on the pixel values (used to determine whether the pixels represent skin or not). Alternatively, if it is assumed that the scene does not change, the skin map can be computed based on one of the frames received while performing auto-exposure.

Image processor 130 may then operate on the skin map as an input, to identify a facial region (an example of a region of interest in one embodiment), as described in detail below. First, the skin map is pre-processed to add additional pixels in a skin map as representing skin and to remove some pixels from being considered skin based on a recognition that points adjacent to skin are likely to be skin and points that are not adjacent to skin are unlikely to be skin.

Pre-processing of Skin Map

Figure 5A:
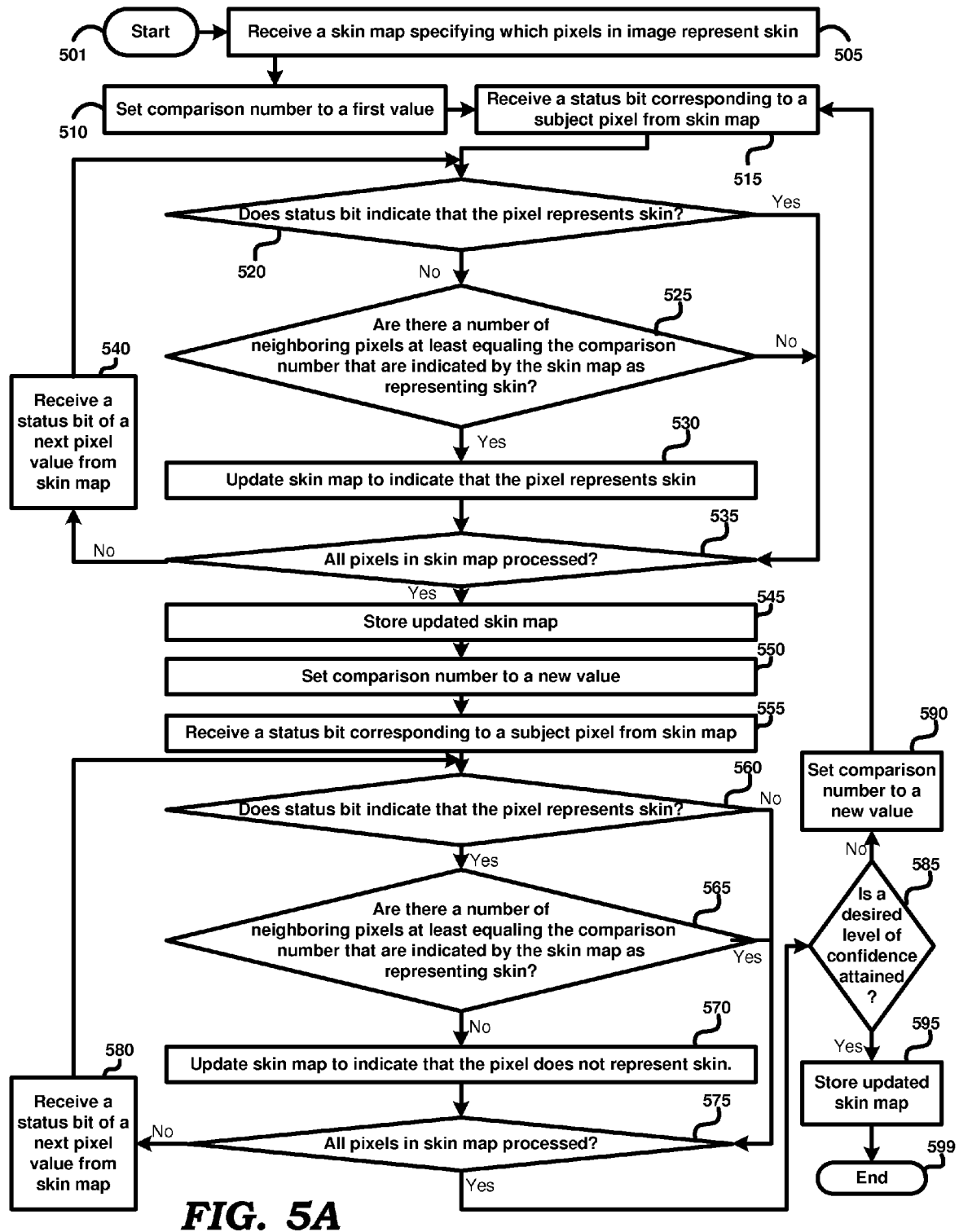
FIGS. 5A, 5B and 6 together represent a flowchart illustrating the manner in which a skin map may be pre-processed prior to determining regions forming a face in one embodiment.
Figure 5B:
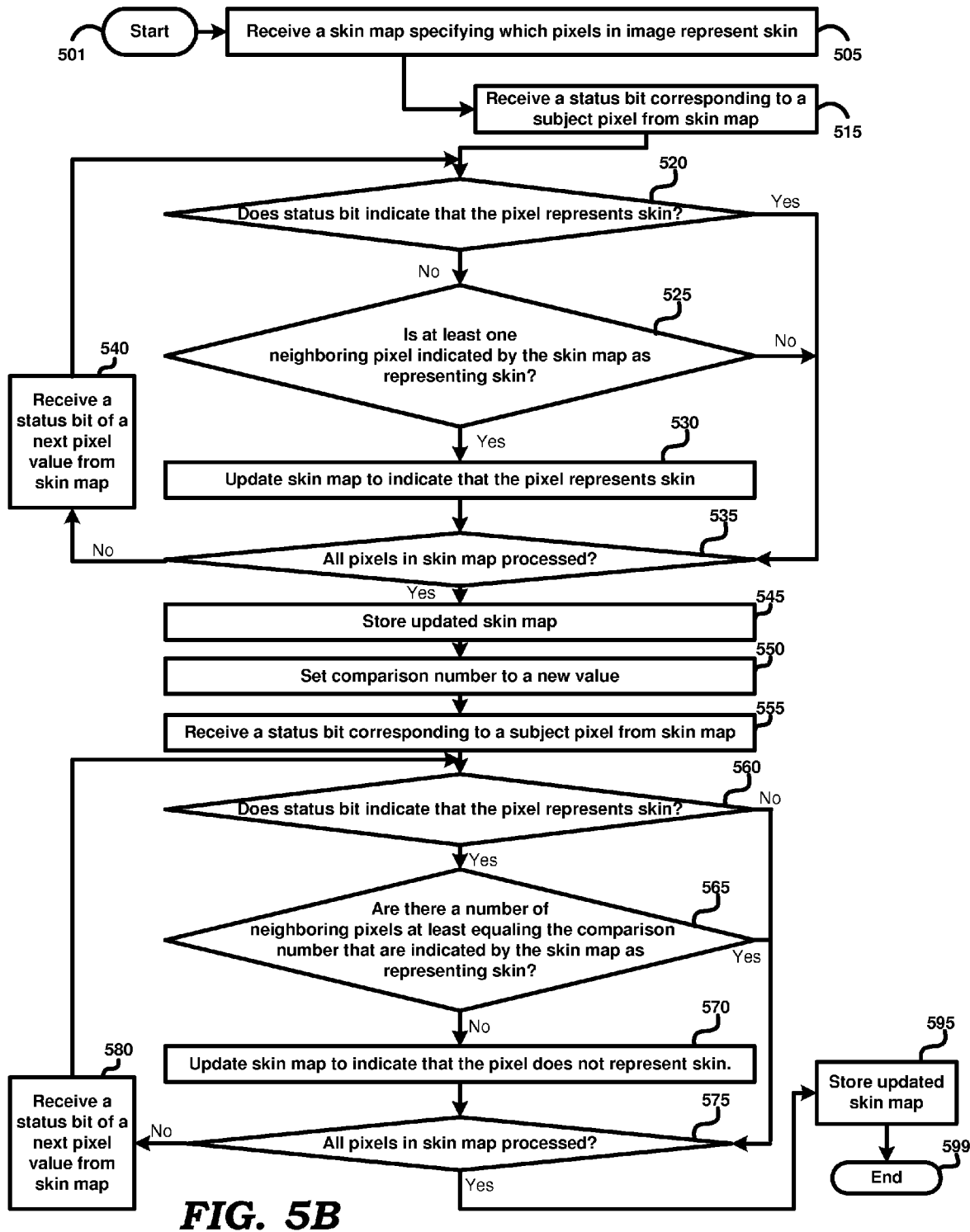
Figure 6:
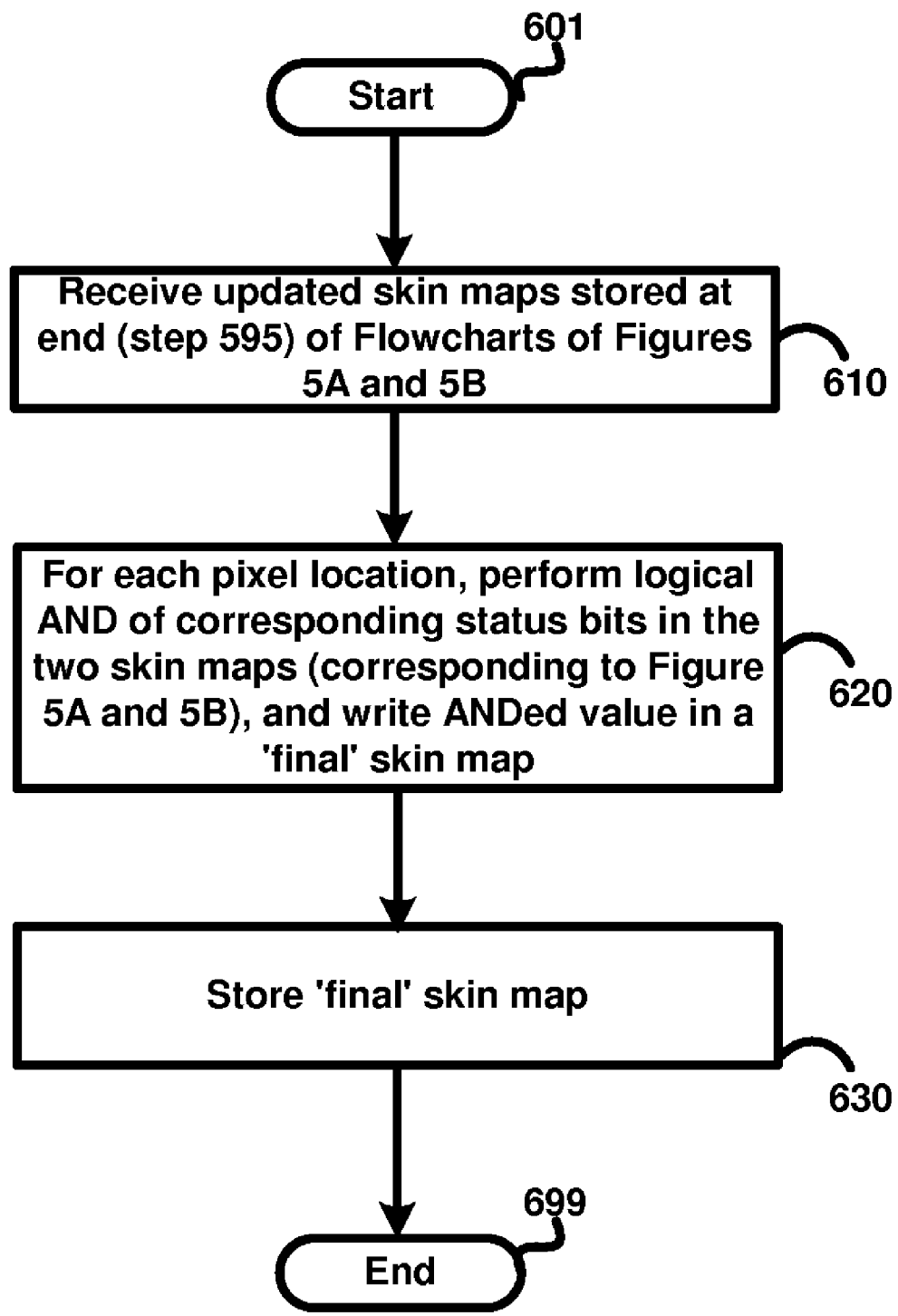

FIGS. 5A, 5B and 6 are flowcharts illustrating the manner in which skin map may be pre-processed prior to determining regions forming a face in one embodiment. Again, the flowchart is described with respect to FIG. 1, and in relation to image processor 130, merely for illustration. However, various features can be implemented in other environments and other components. Furthermore, the steps are described in a specific sequence merely for illustration. Various alternative embodiments in other environments, using other components, and different sequence of steps can also be implemented without departing from the scope and spirit of several aspects of the present invention, as will be apparent to one skilled in the relevant arts by reading the disclosure provided herein. The flowchart of FIG. 5A starts in step 501, in which control passes immediately to step 505.

In step 505, image processor 130 receives a (source) skin map specifying which pixels in the image represent skin. The skin map be generated, for example, by image processor 130 as described above with respect to the flowchart of FIG. 5. Control then passes to step 510.

In step 510, image processor 130 sets a comparison number to a first value. As will be apparent from the description below, the comparison number indicates the number of neighboring pixels representing skin to be present before a subject pixel is also deemed to represent skin. Control then passes to step 515.

In step 515, image processor 130 receives a status bit corresponding to a pixel (as a subject pixel) from the skin map received in step 505. In an embodiment, the status bit is received as a binary value, wherein a binary 1(0) specifies that the (first) pixel has been identified as representing skin, and a binary 0 (1) specifies otherwise. Control then passes to step 520.

In step 520, if the status bit indicates that the pixel represents skin, control passes to step 535, else control passes to step 525.

In step 525, image processor 130 determines from the skin map the number of pixels neighboring (immediately adjacent to) the subject pixel that also represent skin. Control passes to step 530 if image processor 130 determines (from the corresponding values in the skin map) that the number of neighboring pixels representing skin is equal to or greater than the comparison number, else control passes to step 535.

It must be noted that the operation of this step may be preformed at a macro-block level (group of pixels, e.g., 3×3 pixel block) instead of at the pixel level described above, i.e., if a predetermined number of macroblocks surrounding a current (subject) macroblock are marked as skin type then the current macroblock is also marked as skin-type macroblock. Each macroblock may initially be marked as skin type of at least a pre-specified number of pixels within the macroblock are indicated to represent skin in the source skin map.

In step 530, image processor 130 updates the skin map to indicate that the pixel represents skin. Control then passes to step 535.

In step 535, if image processor 130 determines that all pixels in the skin map have been processed control passes to step 545, else control passes to step 540. In step 540, image processor 130 receives a status bit of a next pixel from the skin map. Control then passes to step 520.

In step 545, image processor 130 stores the updated skin map. Control then passes to step 550. In step 550, image processor 130 sets the comparison number to a new value. Control then passes to step 555. In step 555, image processor 130 receives a status bit corresponding to a pixel (as a subject pixel) from the skin map received in step 505. Control then passes to step 560.

In step 560, if the status bit indicates that the pixel represents skin, control passes to step 565, else control passes to step 575. In step 565, image processor 130 determines from the skin map the number of pixels neighboring (immediately adjacent to) the subject pixel that also represent skin. Control passes to step 575 if image processor 130 determines (from the corresponding values in the skin map) that the number of neighboring pixels representing skin is equal to or greater than the comparison number, else control passes to step 570.

In step 570, image processor 130 updates the skin map to indicate that the pixel does not represent skin. Control then passes to step 575.

In step 575, if image processor 130 determines that all pixels in the skin map have been processed control passes to step 585, else control passes to step 580.

In step 580, image processor 130 receives a status bit of a next pixel from the skin map. Control then passes to step 560.

In step 585, if image processor 130 determines that pre-processing of the skin has been performed to a desired level of confidence, control passes to step 595, else control passes to step 590. In an embodiment, a desired level of confidence level is deemed to be reached if a predetermined number of iterations of steps 515 through 575 have been performed. However, different approaches (e.g., based on different criteria such as number of pixels added/removed in an iteration) can be undertaken until a desired level of confidence is attained.

In step 590, image processor 130 sets the comparison number to a new value. In an embodiment, the comparison value set in this step is smaller than the comparison values set in the first iteration of steps 510 and 550. Control then passes to step 515, in which image processor 130 receives the status bit for a first pixel again from the skin map, and the operations of the flowchart are repeated.

In step 595, image processor 130 stores the pre-processed (updated) skin map for further processing. Control then passes to step 599, in which the flowchart ends.

In the flowchart of FIG. 5B all steps are identical to correspondingly (similarly) numbered steps in FIG. 5A, except for the following:

Step 510 is not present, and control passes to step 515 after execution of step 505.

In step 525, if image processor 130 determines that if at least one neighboring pixel is present which is indicated by the skin map as representing skin, control passes to step 530, else control passes to step 535.

c) If in step 575 image processor 130 determines that all pixels in the skin map have been processed, control passes to step 595 in which the updated skin map is stored, and then to step 599 in which the flowchart ends. It may be observed from the flowchart of FIG. 5A that several iterations of each of the two loops formed by steps 515-520-525-530-535-540-520, and by steps 555-560-565-570-575-580-560 may be performed, while only one iteration of each of the loops is performed in the flowchart of FIG. 5B.

Figure 7:
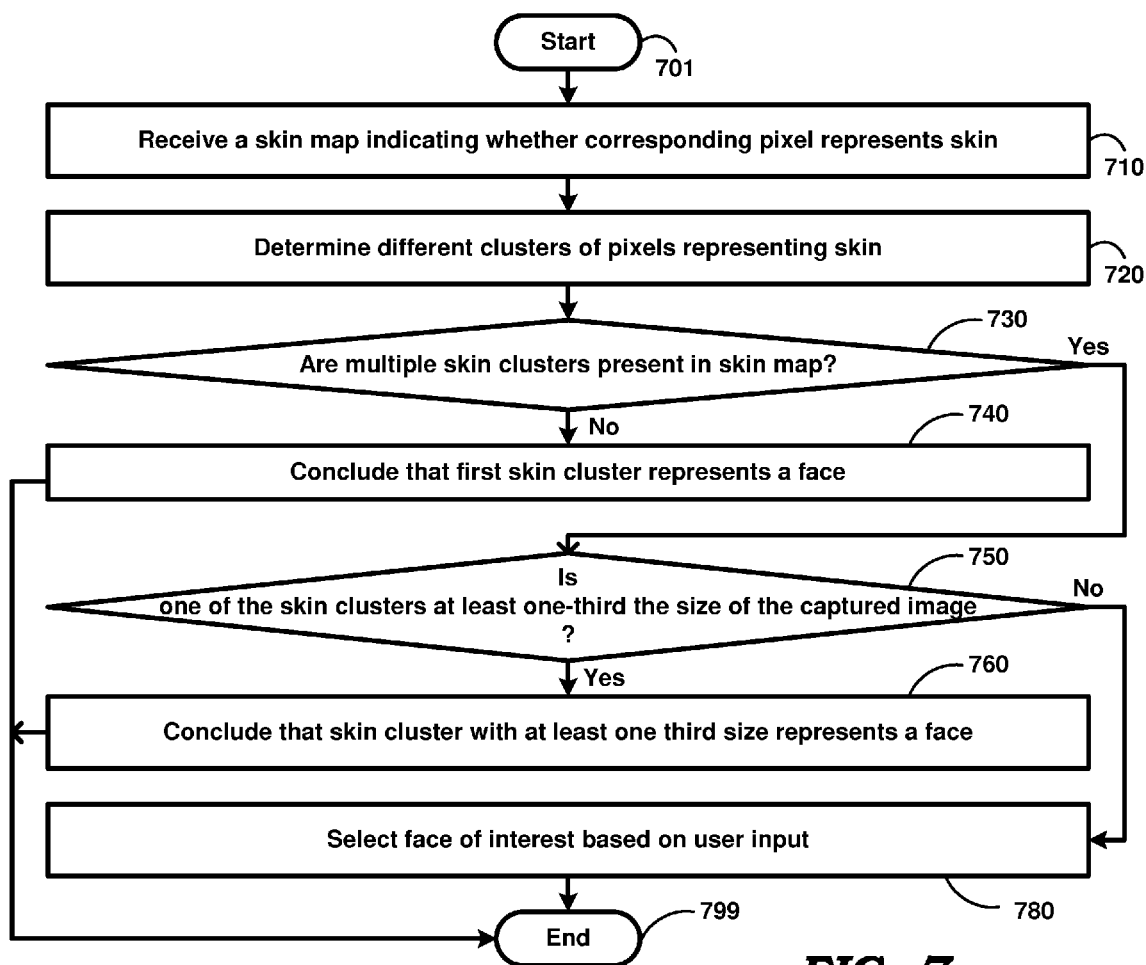
FIG. 7 is a flowchart illustrating the manner in which one or more cluster of pixels are identified and marked as potentially representing a desired facial region in one embodiment.

The skin maps stored at the end (i.e., step 595) of flowcharts of FIGS. 5A and 5B are then processed as illustrated in FIG. 7. Merely for reference, the skin maps generated at the end of processing by the flowcharts of FIGS. 5A and 5B are respectively referred to as skin map A and skin map B. The flowchart of FIG. 6 starts in step 601, in which control passes immediately to step 610.

In step 610, image processor 130 receives the updated skin maps (A and B) stored at end (step 695) of Flowcharts of FIGS. 5A and 5B. Control then passes to step 620.

In step 620, for each pixel location in skin maps A and B, image processor 130 performs a logical AND operation of the corresponding status bits, and writes the ANDed value to the corresponding pixel location in a "final" skin map. Control then passes to step 630.

In step 630, image processor stores the 'final' skin map for further processing. Control then passes to step 699 in which the flowchart ends.

It may be observed that the operations of the steps of flowcharts 5A, 5B and 6 may add additional pixels in a skin map as representing skin and remove some pixels from being considered skin. In particular, the loop formed by steps 515-520-525-530-535-540-520 operates to mark 'non-skin' pixels as skin-pixels, and the loop formed by steps 555-560-565-570-575-580-560 operates to remove skin pixels from being considered skin.

As an example, pixels representing eye, although not of face color, would need to be identified (and included) as part of a facial region. The loop formed by steps 515-520-525-530-535-540-520 may cause addition of 'skin' pixels (pixels in the eye region added as 'skin' pixels) to the skin map, and thus enables identification of such pixels also as potentially lying in a facial region.

Noise and other undesirable effects may erroneously cause a pixel otherwise not representing skin to be captured as a 'skin' pixel in the skin map prior to the processing of FIGS. 6A and 6B. The loop formed by steps 555-560-565-570-575-580-560 may cause such a pixel to be removed from the pixel map. Also, it is noted that the operation of the steps of flowcharts 6A and 6B, and the ANDing operation in flowchart of FIG. 7 may be performed to prevent or minimize the probability of two separate but closely spaced skin clusters from merging.

At the completion of pre-processing, the 'final' skin map (obtained at step 630 of FIG. 6) may contain one or more 'clusters' of pixels (a group of adjoining/contiguous pixel locations) identified as skin pixels, each cluster potentially representing a facial region.

Identifying and Marking Potential Facial Regions

FIG. 7 is a flowchart illustrating the manner in which image processor 130 identifies and marks one or more cluster (group) of pixels as potentially representing a desired facial region in one embodiment. The flowchart is described with respect to a single cluster (termed 'first' cluster, merely to simplify the following description), however relevant steps (720-760) in the flowchart may be performed to locate all skin clusters present in the skin map. The flowchart starts in step 701, in which control passes immediately to step 710.

In step 710, image processor 130 receives a skin map indicating whether each corresponding pixel represents skin. The skin map may be pre-processed, for example, as described above with respect to the flowchart of FIGS. 5A, 5B and 6. Control then passes to step 720.

In step 720, image processor 130 determines different clusters of pixels representing skin by examining the skin map. In general, skin pixels in contiguous locations, reasonably representing dimensions of a face may be viewed as a cluster. Ideally, the number of clusters equals the number of faces (assuming non-overlap of faces in the captured image) in the image. Control then passes to step 730.

In step 730, image processor 130 checks whether there are multiple skin clusters present in skin map. Control passes to step 740 if there is only a single skin cluster, or else to step 750. In step 740, image processor 130 concludes that the lone skin cluster represents a face. Control then passes to step 799, in which the flowchart ends.

In step 750, image processor 130 checks whether one of the skin clusters is at least one-third (or some reasonably large size) the size of the captured image. Control passes to step 760 if there is such a skin cluster, or else to step 780.

In step 760, image processor 130 concludes that skin cluster with at least one third size represents a face. Control then passes to step 799.

In step 780, image processor 130 selects the face of interest based on user input. Thus, image processor 130 may display a rectangle surrounding each of the faces, and receive an input from user via input interface 160 indicating which of the rectangles should be used as a basis for auto-exposure. Control then passes to step 799.

Having thus identified the facial region of interest, image processor 130 processes the corresponding pixel values (for example, luminance (Y) component, as described above) of pixels in the facial region, determines the corresponding level of brightness of the facial region, and provides a set of exposure parameters to shutter assembly 110 as described in sections above. The operation of the steps described above are briefly illustrated below with an example.

Illustrative Example of Facial Region Identification

FIGS. 8A-8J provide an example illustration of the operation of the steps of flowcharts of FIGS. 5A, 5B, 6 and 7. Black areas in the Figures denote skin pixels, and white areas denote non-skin pixels.

Figure 8A:
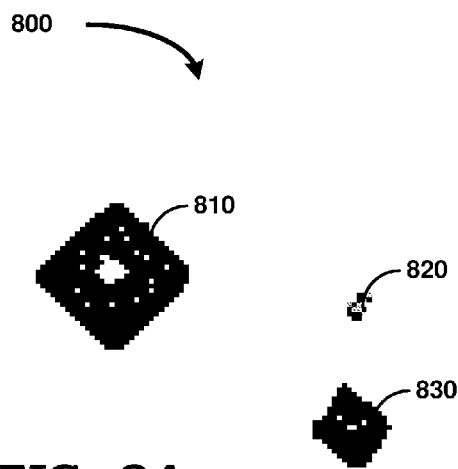
FIGS. 8A through 8J are example diagrams illustrating the operation of the flowcharts of FIGS. 5A, 5B, 6 and 7 in one embodiment.

In FIG. 8A, a (source) skin map 800 of a captured image is shown in which three skin clusters 810, 820 and 830 may be seen.

Figure 8B:
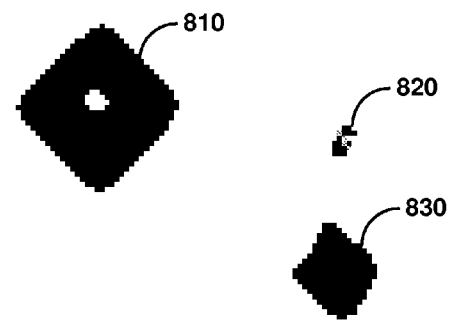

A first iteration of steps 515-520-525-530-535-540-520 (FIG. 5A) with comparison number set to 3 (step 510) may result in the skin map of FIG. 8A updated to provide the skin map of FIG. 8B, in which it may be seen that some non-skin (white) pixels in each of clusters 810, 820 and 830 have been indicated as skin (black) pixels.

Figure 8C:
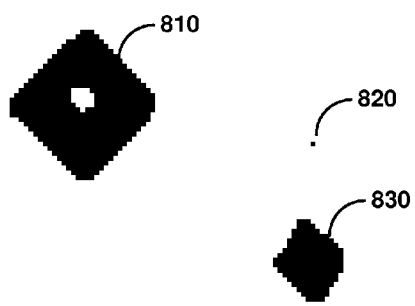

A first iteration of steps 555-560-565-570-575-580-560 (FIG. 5A) with comparison number set to 5 (step 550) may result in the skin map of FIG. 8B updated to provide the skin map of FIG. 8C, in which it may be seen that some skin pixels in clusters 810 and 820 have been removed.

Figure 8D:
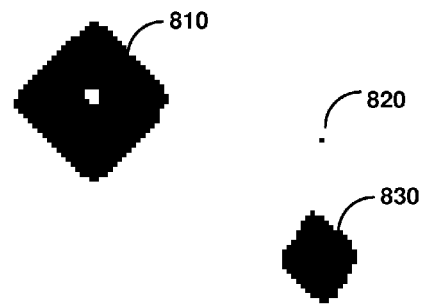

A second iteration of steps 515-520-525-530-535-540-520 (FIG. 5A) with comparison number set to 3 (step 510) may result in the skin map of FIG. 8C updated to provide the skin map of FIG. 8D, in which it may be seen that some non-skin pixels in cluster 810 have been indicated as skin pixels.

Figure 8E:
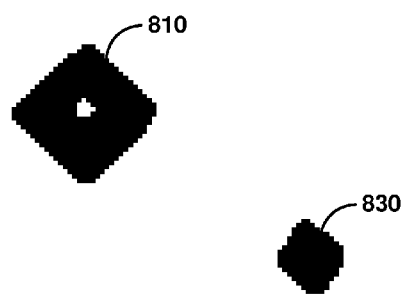

A second iteration of steps 555-560-565-570-575-580-560 (FIG. 5A) with comparison number set to 5 (step 550) may result in skin map of FIG. 8D updated to provide the skin map of FIG. 8E, in which it may be seen that some skin pixels in cluster 810 have been removed, and cluster 820 has been completely removed.

Figure 8F:
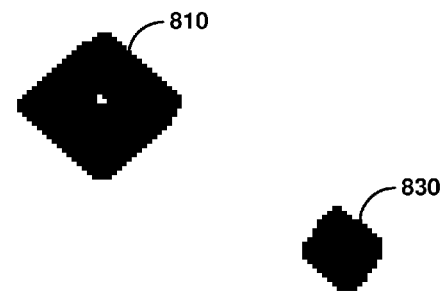

A third iteration of steps 515-520-525-530-535-540-520 (FIG. 5A) with comparison number set to 2 (step 510) may result in the skin map of FIG. 8E updated to provide the skin map of FIG. 8F, in which it may be seen that some non-skin pixels in cluster 810 have been indicated as skin pixels.

Figure 8G:
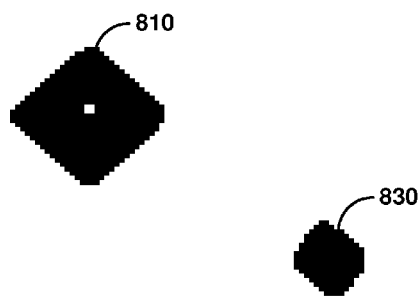

A third iteration of steps 555-560-565-570-575-580-560 (FIG. 5A) with comparison number set to 5 (step 550) may result in skin map of FIG. 8F updated to provide the skin map of FIG. 8G.

Figure 8H:
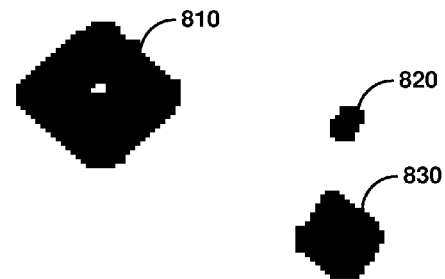

Operation of steps 515-520-525-530-535-540-520 (FIG. 5B) may result in the skin map of FIG. 8A updated to provide the skin map of FIG. 8H, in which it may be seen that some non-skin pixels in clusters 810, 820 and 830 have been indicated as skin pixels. FIG. 8H may be compared with FIG. 8B which was obtained using a comparison number of three.

Figure 8I:
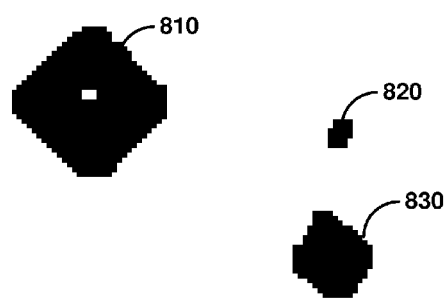

Operation of steps 555-560-565-570-575-580-560 (FIG. 5B) with comparison number set to 5 (step 550) may result in the skin map of FIG. 8H updated to provide the skin map of FIG. 8I, where some pixels have been removed.

Figure 8J:
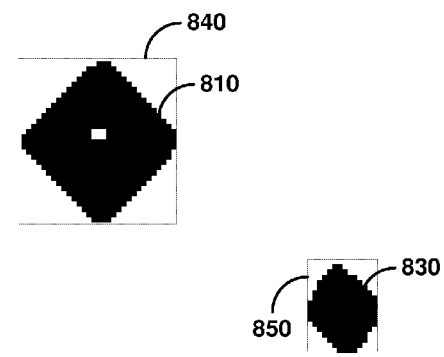

Finally, FIG. 8J shows the 'final' skin map obtained by ANDing corresponding pixels in the skin maps of FIGS. 8G and 8I. FIG. 8J shows two skin clusters 810 and 830. Operation of the steps of the flowchart of FIG. 8 identify (locate) the two skin clusters 810 and 830, and marks the corresponding boundaries 840 and 850.

Image processor 130 may display the image corresponding to the skin map shown in FIG. 8J, and prompt the user to indicate the desired region of interest. The user may then indicate, via input interface 160 (shown in FIG. 1), that the desired region of interest (810) is the skin/facial pixels contained in rectangular area 840. It may be appreciated that the operations described with respect to FIGS. 8A-8J are performed on the sub-sampled images (with respect sub-window logic 230 and step 310) noted above.

Image processor 130 sets the exposure parameters to obtain optimal brightness for pixels within the desired region of interest, and waits for the user to 'click' and captures and stores the image.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of operating a shutter assembly in a camera comprising:
   receiving a plurality of sets of pixel values representing a corresponding plurality of images of a scene and obtained with a shutter assembly configured using one of a plurality of sets of exposure parameters;
   identifying a region of interest comprising a portion of said scene said region of interest having a different level of brightness in each of said plurality of sets of pixel values;
   determining a first set of exposure parameters of said plurality of sets of exposure parameters to achieve a desired level of brightness by generating a plurality of sub-sampled images representing said scene; and
   generating signals to configure said shutter assembly using said first set of exposure parameters,
   wherein each set of said plurality of sets of exposure parameters is configured to obtain a different level of brightness.
   further wherein, each subsampled image of said plurality of subsampled images is generated from the corresponding image of said scene.

2. The method of claim 1, wherein said determining further comprises:
   computing a plurality of brightness values, wherein each of said plurality of brightness values characterizes a level of brightness of pixels in said region of interest; and
   setting said first set of exposure parameters to equal one of said plurality of sets of exposure parameters for which a corresponding brightness value is closest to a predetermined value.

3. The method of claim 2, wherein each of said plurality of brightness values is obtained by averaging a luminance component of pixel values of pixels in said region of interest in the corresponding one of said plurality of sets of pixel values.

4. The method of claim 2, wherein each subsampled image has fewer pixels compared to the corresponding image, further wherein said identifying is performed by examining said plurality of subsampled images and said computing is performed based on said plurality of sets of pixel values representing said image without subsampling.

5. The method of claim 4, wherein each of said plurality of subsampled images is generated by averaging a group of adjacent pixel values and generating a single pixel value for the subsampled image.

6. The method of claim 1, wherein said region of interest corresponds to a face of a human being.

7. The method of claim 1, further comprising enabling a user of said camera to capture an image of said scene with said shutter assembly configured with said first set of exposure parameters.

8. A non-transitory computer readable medium carrying one or more sequences of instructions for operating a shutter assembly in an image capture device (ICD) wherein execution of said one or more sequences of instructions by one or more processors contained in said ICD causes said one or more processors to perform the actions of:
   receiving a plurality of sets of pixel values representing a corresponding plurality of images of a scene and obtained with a shutter assembly configured using one of a plurality of sets of exposure parameters;
   identifying a region of interest comprising a portion of said scene said region of interest having a different level of brightness in each of said plurality of sets of pixel values;
   determining a first set of exposure parameters of said plurality of sets of exposure parameters to achieve a desired level of brightness by generating a plurality of sub-sampled images representing said scene; and
   generating signals to configure said shutter assembly using said first set of exposure parameters,
   wherein each set of said plurality of sets of exposure parameters is configured to obtain a different level of brightness,
   further wherein each subsampled image of the plurality of subsampled images is generated from the corresponding image of said scene.

9. The non-transitory computer readable medium of claim 8, wherein said determining further comprises:
   computing a plurality of brightness values, wherein each of said plurality of brightness values characterizes a level of brightness of pixels in said region of interest; and
   setting said first set of exposure parameters to equal one of said plurality of sets of exposure parameters for which a corresponding brightness value is closest to a predetermined value.

10. The non-transitory computer readable medium of claim 9, wherein each of said plurality of brightness values is obtained by averaging luminance component of pixel values of pixels in said region of interest in the corresponding one of said plurality of sets of pixel values.

11. The non-transitory computer readable medium of claim 9, wherein each subsampled image has fewer pixels compared to the corresponding image,
   further wherein said identifying is performing by examining said plurality of subsampled images and said computing is performed based on said plurality sets of pixel values representing said image without subsampling.

12. The non-transitory computer readable medium of claim 11, wherein each of said plurality of subsampled images is generated by averaging a group of adjacent pixel values and generating a single pixel value for the subsampled image.

13. The non-transitory computer readable medium of claim 8, wherein said region of interest corresponds to a face of a human being.

14. The non-transitory computer readable medium of claim 8, further comprising enabling a user of said ICD to capture an image of said scene with said shutter assembly configured with said first set of exposure parameters.

15. An image capture device (ICD) for capturing an image of a scene, said ICD comprising:
    an image sensor designed to generate a plurality of sets of pixel values;
    a shutter assembly configurable to control an amount of light incident on said image sensor, wherein each set of pixel values represents a corresponding image of a scene at a corresponding time instance and is obtained with said shutter assembly configured using one of a plurality of sets of exposure parameters, wherein each set of exposure parameters is configured to obtain a different level of brightness and causes said image to be captured on said image sensor with a corresponding level of brightness;
    an image processor designed to:
        identify a region of interest forming a part of said scene,
        determine a first set of exposure parameters to achieve a desired level of brightness based on said levels of brightness and at least one of said plurality of sets of exposure parameters,
        generate signals to configure said shutter assembly using said first set of exposure parameters, and
        generate a plurality of subsampled images representing said scene,
        wherein each subsampled image is generated from the corresponding image of said scene.

16. The ICD of claim 15, wherein said image processor is designed to compute a plurality of brightness values, wherein each of said plurality of brightness values characterizes a level of brightness of said region of interest in the corresponding one of said plurality of sets of pixel values, and to set said first set of exposure parameters to equal one of said plurality of sets of exposure parameters with which a desired level of brightness is obtained for said region of interest in a corresponding set of pixel values.

17. The ICD of claim 16, wherein said image processor computes each of said plurality of brightness values by averaging a luminance component of pixel values of pixels in said region of interest in the corresponding one of said plurality of sets of pixel values.

18. The ICD of claim 16, wherein each subsampled image has fewer pixels compared to the corresponding image, wherein said image processor,
    further wherein said image processor identifies said region of interest by examining said plurality of subsampled images, and computes said plurality of brightness values based on said plurality of sets of pixel values representing said image without subsampling.

19. The ICD of claim 18, wherein said image processor generates each of said plurality of subsampled images by averaging a group of adjacent pixel values and generating a single pixel value for the subsampled image.

20. The ICD of claim 15, wherein said region of interest corresponds to a face of a human being.

* * * * *